US011288510B2

(12) United States Patent
Williams, Jr. et al.

(10) Patent No.: US 11,288,510 B2
(45) Date of Patent: Mar. 29, 2022

(54) WASHROOM DEVICE AUGMENTED REALITY INSTALLATION SYSTEM (71) Applicant: Kimberly-Clark Worldwide, Inc., Neenah, WI (US)

(72) Inventors: Frederick J. Williams, Jr., Cumming, GA (US); Babak R. Ghazi, Smyrna, GA (US); Alexandra L. Wilson, Woodstock, GA (US); Stephen Becker, Cumming, GA (US); Andrew J. Thomson, Decatur, GA (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 16/647,395

(22) PCT Filed: Sep. 15, 2017

(86) PCT No.: PCT/US2017/051735
§ 371 (c)(1),
(2) Date: Mar. 13, 2020

(87) PCT Pub. No.: WO2019/055024
PCT Pub. Date: Mar. 21, 2019

(65) Prior Publication Data
US 2020/0218894 A1    Jul. 9, 2020

(51) Int. Cl.
*G06K 9/00* (2006.01)
*G06K 9/62* (2006.01)
(Continued)

(52) U.S. Cl.
CPC ..... *G06K 9/00671* (2013.01); *G06F 3/04842* (2013.01); *G06F 3/04847* (2013.01);
(Continued)

(58) Field of Classification Search
CPC ............ G06K 9/00671; G06K 9/6201; G06K 2209/01; G06T 7/70; G06F 3/04842; G06F 3/04847; H04L 67/36; H04N 5/23238
See application file for complete search history.

(56) References Cited

U.S. PATENT DOCUMENTS 8,743,145 B1 *  6/2014  Price ..................... G06F 16/954
                                                              345/633
8,811,377 B1 *  8/2014  Weston ............. H04W 52/0219
                                                              370/351
(Continued)

FOREIGN PATENT DOCUMENTS

KR    20130092836 A    8/2013
WO       13150091 A1   10/2013
(Continued)

OTHER PUBLICATIONS

Ramon F. Brena et al, "Evolution of Indoor Positioning Technologies: A Survey", published Mar. 29, 2017 in Journal of Sensors vol. 2017 (Year: 2017).*
(Continued)

*Primary Examiner* — Shourjo Dasgupta (57) ABSTRACT

A system and method for joining devices to a network by use of any augmented reality installation device. The installation system described herein includes an installation device, e.g., a smart phone, that includes a camera to capture an image of the device(s) in a facility, e.g., the area in which the devices are mounted or positioned for end user use. Then, through use of image analysis techniques and a graphical user interface (GUI) on the installation device, e.g., dispensers, in the image are individually identified and joined to the network.

15 Claims, 6 Drawing Sheets (51) Int. Cl.
*G06T 7/70* (2017.01)
*G06F 3/0484* (2013.01)
*H04L 29/08* (2006.01)
*H04N 5/232* (2006.01)
*G06F 3/04842* (2022.01)
*G06F 3/04847* (2022.01)
*H04L 67/75* (2022.01)

(52) U.S. Cl.
CPC .............. *G06K 9/6201* (2013.01); *G06T 7/70* (2017.01); *H04L 67/36* (2013.01); *H04N 5/23238* (2013.01); *G06K 2209/01* (2013.01)

(56) References Cited

U.S. PATENT DOCUMENTS

| | | | |
|---|---|---|---|
| 2005/0171634 A1* | 8/2005 | York | G16H 40/20 700/231 |
| 2007/0298812 A1* | 12/2007 | Singh | H04L 29/12122 455/456.1 |
| 2008/0133955 A1* | 6/2008 | Westerfield | G06F 11/006 713/340 |
| 2011/0276151 A1* | 11/2011 | Feri | H05B 47/155 700/83 |
| 2012/0054527 A1* | 3/2012 | Pfeifer | G06F 11/203 713/340 |
| 2014/0002439 A1* | 1/2014 | Lynch | G06T 11/00 345/419 |
| 2015/0092233 A1* | 4/2015 | Park | H04N 1/00307 358/1.15 |
| 2016/0036764 A1* | 2/2016 | Dong | H04L 61/6022 370/254 |
| 2016/0071325 A1 | 3/2016 | Callaghan | |
| 2016/0171566 A1* | 6/2016 | Pugh | G06Q 30/0281 705/346 |
| 2016/0171577 A1* | 6/2016 | Robinson, Jr. | G06Q 30/0613 705/7.13 |
| 2016/0212223 A1* | 7/2016 | Yang | H04L 61/2015 |
| 2017/0109391 A1 | 4/2017 | Rosen et al. | |
| 2017/0372159 A1* | 12/2017 | Schimmel | G06K 9/00744 |
| 2018/0050450 A1* | 2/2018 | Parrott | B25J 9/0084 |
| 2018/0083916 A1* | 3/2018 | Xu | H04L 61/2007 |
| 2018/0083917 A1* | 3/2018 | Xu | H04L 61/2038 |
| 2018/0365405 A1* | 12/2018 | Mistry | G06F 3/017 |
| 2020/0312029 A1* | 10/2020 | Heinen | G06T 7/579 |

FOREIGN PATENT DOCUMENTS

| | | |
|---|---|---|
| WO | 17032697 A1 | 3/2017 |
| WO | 17074406 A1 | 5/2017 |
| WO | 19045745 A1 | 3/2019 |

OTHER PUBLICATIONS

Sanni Siltanen, "Theory and applications of marker-based augmented reality", published in 2012 at https://www.vttresearch.com/sites/default/files/pdf/science/2012/S3.pdf, retrieved Nov. 19, 2021 (Year: 2012).*

* cited by examiner

WASHROOM DEVICE AUGMENTED REALITY INSTALLATION SYSTEM

TECHNICAL FIELD

This disclosure generally relates to joining (or installing) washroom devices on a network, for example, a wireless network.

BACKGROUND OF THE DISCLOSURE

Wireless networks are commonplace in many environments. Joining (or installing or commissioning) devices on a network can take many forms. Such a process may result in the device joining the network being assigned or receiving a name or reference identifier that, example, can be used to uniquely or quasi-uniquely identify that device within the network, e.g., for purposes or sending or receiving network communications.

SUMMARY OF THE DISCLOSURE

In general, the subject matter of this specification relates to a system for joining a device, for example, a washroom device such as a hand towel dispenser, to a network. One aspect of the subject matter described in this specification can be implemented in systems that include an installation device comprising a screen and an imaging device, wherein the imaging device is configured to capture a representation of an environment having at least one network-enabled washroom dispenser and the screen is configured to visually present the representation for viewing by a user; and an application configured to analyze the representation to identify, as a dispenser device, the at least one dispenser and present a graphical user interface, as an overlay on the representation, through which the user can select the at least one dispenser by interacting with the graphical user interface; determine a unique identifier of the at least one dispenser; and generate a network name for the at least one dispenser different from the unique identifier. Other embodiments of this aspect include corresponding methods, apparatus, and computer program products.

Another aspect of the subject matter described in this specification can be implemented in a method comprising capturing, through use of an installation device, an image of a washroom environment having an network-enabled washroom dispenser; displaying the image on the device; providing a graphical user interface simultaneously with the display of the image; accepting an user input to the graphical user interface to select the at least one washroom dispenser; determining a unique identifier of the dispenser; generating a network name for the dispenser based on a relative location of the dispenser in the washroom environment. Other embodiments of this aspect include corresponding systems, apparatus, and computer program products.

Particular embodiments of the subject matter described in this specification can be implemented so as to realize one or more of the following advantages. The device installation system facilitates the joining of devices to a network without the need to individually or manually identify the devices. For example, as opposed to manually entering a device ID for each device, the system can visually, through an augmented reality interface, identify each device and join it to the network including determining the location of each device in the facility, e.g., washroom. This reduces human error when joining devices to the network and also speeds the process as time-consuming manual entry of detailed device information can be avoided or reduced.

This location information, in some implementations, can be embedded in the device name thereby allowing a user to immediately know the location of the device by examining only its name. For example, based on the device name, a reader, e.g., facility service attendant, can locate and identify the specific device in a room or area without having to (build and then) consult a table or list or memorize device names and corresponding locations. In the context of washroom hand towel dispenser, messages or alerts, including the dispenser's network name, may be sent to service personnel when a dispenser needs to be refilled. Through use of such a device naming convention the message or alert can simply include the device name and with that information alone the service attendant can easily locate the dispenser that needs the refill, as opposed to having to include additional location information in the message (which would require a larger message file and/or additional bandwidth and/or additional system resources) or otherwise requiring the service attendant to consult a list or table to determine the location or memorize device locations. Thus system resources are conserved, e.g., either because a shorter file or less transmission bandwidth is required for the message or because additional tables or lists linking device names to locations are not required to be generated.

The details of one or more implementations of the subject matter described in this specification are set forth in the accompanying drawings and the description below. Other features, aspects, and advantages of the subject matter will become apparent from the description, the drawings, and the claims.

Repeat use of reference characters in the present specification and drawings is intended to represent the same or analogous features or elements of the disclosure.

DETAILED DESCRIPTION OF THE DISCLOSURE

Joining devices to a network has often been a very manual, time-consuming and error-prone process. The installation system described herein includes an installation device, e.g., a smart phone, that includes a camera to capture an image of the device(s) in a facility, e.g., the area in which the devices are mounted or positioned for end user use. Then, through use of image analysis techniques and a graphical user interface (GUI) on the installation device, the devices, e.g., dispensers, in the image are individually identified and joined to the network. For example, a user of the installation device may interact with the GUI to cause the installation device to "read," e.g., through an optical character recognition process, the serial numbers or other identifying marks on the devices such as bar codes or QR codes. With such a device identifier in hand the installation device can facilitate the process of joining the device to the network, e.g., through a handshaking process initiated by either the installation device or the network server managing the network.

Further, through the image analysis process, the installation device may determine relative positions of the devices in the facility, e.g., soap dispenser X is closest to the entryway of the facility and hand towel dispenser Y is immediately to the left of soap dispenser X. Moreover, by leveraging other location functions available or accessible to the installation device, e.g., GPS, cellular or/and Wi-Fi signal strength levels, and/or other location services or techniques, e.g., triangulation, the installation device can assign relative and/or absolute location information to each device joined to the network. Based on this location information, the installation system can generate a name for the device that permits a user to readily discern the location of the device. Such information, for example, may assist a user to readily identify a certain device among a group of devices through a quick visual assessment of the devices. This system is described in more detail with reference to FIG. 1, which is a block diagram of an example environment in which a washroom device installation system can be implemented.

Figure 1:
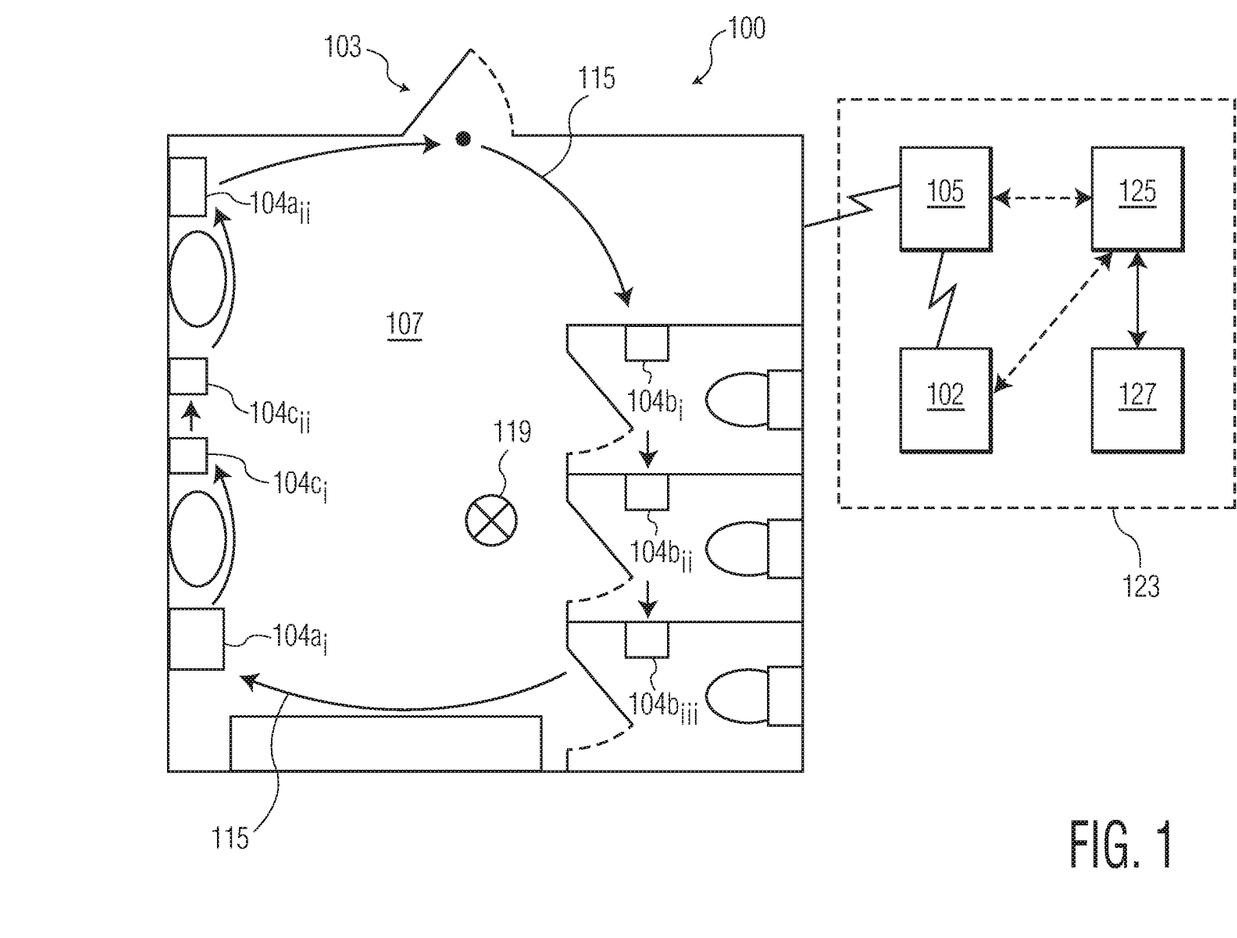
FIG. 1 is a block diagram of an example environment in which a washroom device installation system can be implemented.

The environment 100 in FIG. 1 includes a facility 107, e.g., a washroom, one or more end point devices 104, a device installation system 123, which may include one or both of a data processing apparatus 102 and the installation device 105. The system 123 joins devices 104 to a network, as described in more detail below. More generally, the environment 100 can include one or more facilities 107, for example, a semi-private or public washroom 107, break room 107 or another defined space or area in which devices 104, such as for example, hygiene dispensers, are located. In some implementations, a facility 107 is a closed or defined room or space with at least one door or entry/exit point. In some implementations, an end point device 104 is any device for which the installation system 123 has or will generate a name for that device 104. In some implementations the device 104 is a network enabled device such that it has a receiver, transmitter or transceiver to communicate, through a wired or wireless connection, over a network and/or with the installation system 123. An end point device 104 can include, for example, a hand towel dispenser 104a, bath tissue dispenser 104b, hand soap (or other cleansing) dispenser 104c, hand or facial care dispenser (not pictured), surface cleaning, sanitizing or disinfecting dispenser (not pictured) including for toilets or urinals, and/or the like, door opening/closing counter, etc., each of these being a different type of end point device 104. As used herein, joining (or being installed on) a network means associating a device 104 with that network or the installation system 123 such that the installation system 123 can generate (and optionally assign) a name for that device 104, e.g., to identify that device on the network for, for example, sending to and receiving messages from that device 104.

As described above, the installation system 123 can communicate with devices 104 across wireless or wired channels, or some combination thereof. For example, the installation system 123 includes a transceiver and microprocessor to facilitate such communications. In some implementations, the installation system 123 is connected to a WAN or LAN to communicate to and with the end point devices 104 and other devices such as mobile devices, e.g., the mobile installation device 105, and/or servers.

The installation system 123 generates, for each facility 107 in an environment 100, such as for a floor of a multi-floor building, a building or set of buildings, configuration data for the end point devices 104 that associate the end point devices 104 with the respective facility 107 based on a protocol. For example, the configuration data include a name for each end point device 104 and an association between the end point device 104 and the facility 107 or building in which that device 104 is located. The name of the device 104 uniquely or quasi-uniquely identifies the device 104 in the environment 100. In some implementations, the installation system 123 names the devices 104 based on their relative positions along a path (e.g., path 115) defined in each facility 107, as described in more detail below.

Figure 2A:
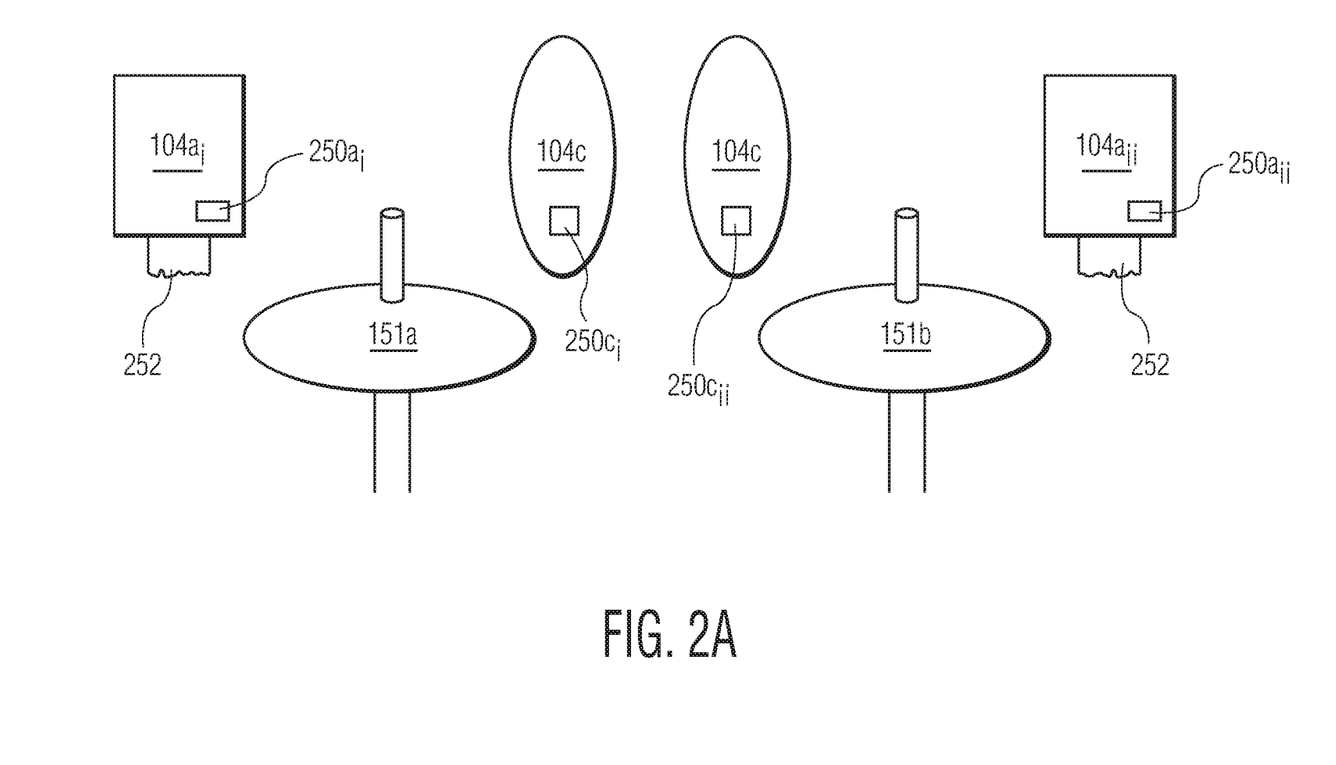
FIG. 2A is a representation of a washroom environment.
Figure 2B:
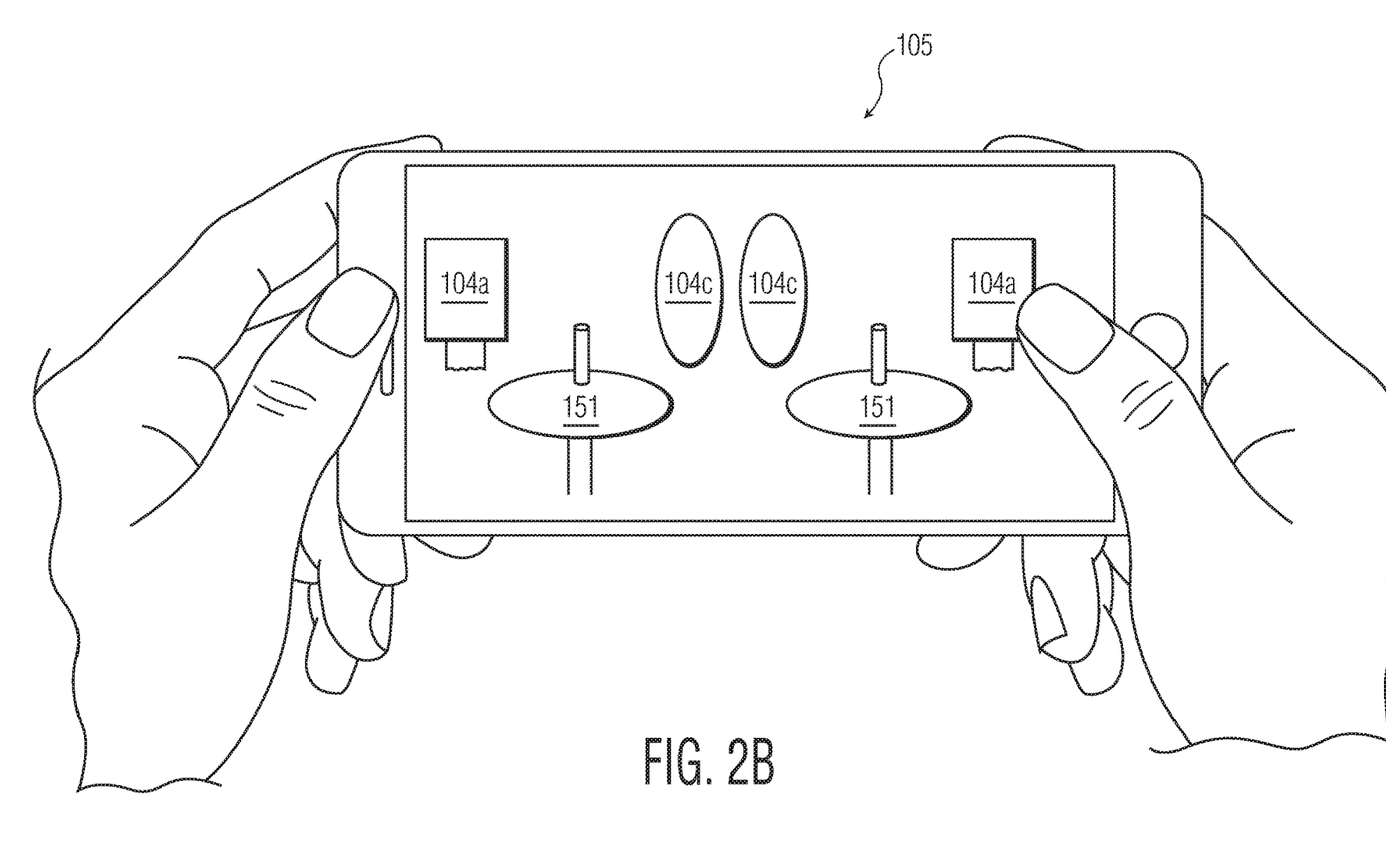
FIG. 2B is a representation of an example installation device capturing an image of the environment of FIG. 2A.

FIG. 2A is a representation of a washroom environment. More specifically, FIG. 2A is a representation of a washroom environment of FIG. 1 taken proximate the reference point 119 and showing, from left to right, the hand towel dispenser $104a_i$, the sink 151a, the hand soap dispenser $104c_i$, the hand soap dispenser $104c_{ii}$, the sink 151b, and the hand towel dispenser $104a_{ii}$. FIG. 2B is a representation of an example installation device 105 capturing an image of the environment of FIG. 2A.

The installation device 105 includes a screen 220 and an imaging device, e.g., a camera (not shown). The installation device 105 can be, for example, a smart phone, a tablet, a laptop, or the like. As described above, the installation device 105 depicted in FIG. 2B has captured the representation of the washroom environment of FIG. 2A. For example, the camera of the smart phone 105 was used to take a picture (or capture a video) of the devices 104 and fixtures (e.g., sinks) of the facility 107 in FIG. 2A. More generally, the imaging device 105 captures representations/images of an environment 100 (e.g., facility 107) having at least one network-enabled washroom dispenser 104 and the screen 220 visually presents the representation for viewing by a user. For example, a user could use the installation device 105 to capture multiple representations of a facility 107 (e.g., all four walls of a rectangular washroom 107) showing all devices 104 present in the facility 107. The representations can overlap, e.g., show one or more of the same devices 104 or they can each show distinct devices 104 not captured by another representation or the image could be a continuous video panning around to capture all devices 104 in the facility 107.

The installation system 123 also includes an application 125. The application 125 analyzes the representation captured in the image to identify dispenser devices 104 depicted in the representation. The application also causes the installation device 105 to present a graphical user interface 270 on the screen 220, as an overlay on the representation or image, through which a user can select dispenser devices 104 by interacting with the graphical user interface 270. The application 125 also determines a unique identifier of each dispenser device 104, e.g., serial number, and generates a network name for each dispenser device 104 different from the corresponding unique identifier. For example, the unique identifier may be the device's serial number and the network name may be an alphanumeric string that includes the device's location, as described in more detail below.

Figure 2C:
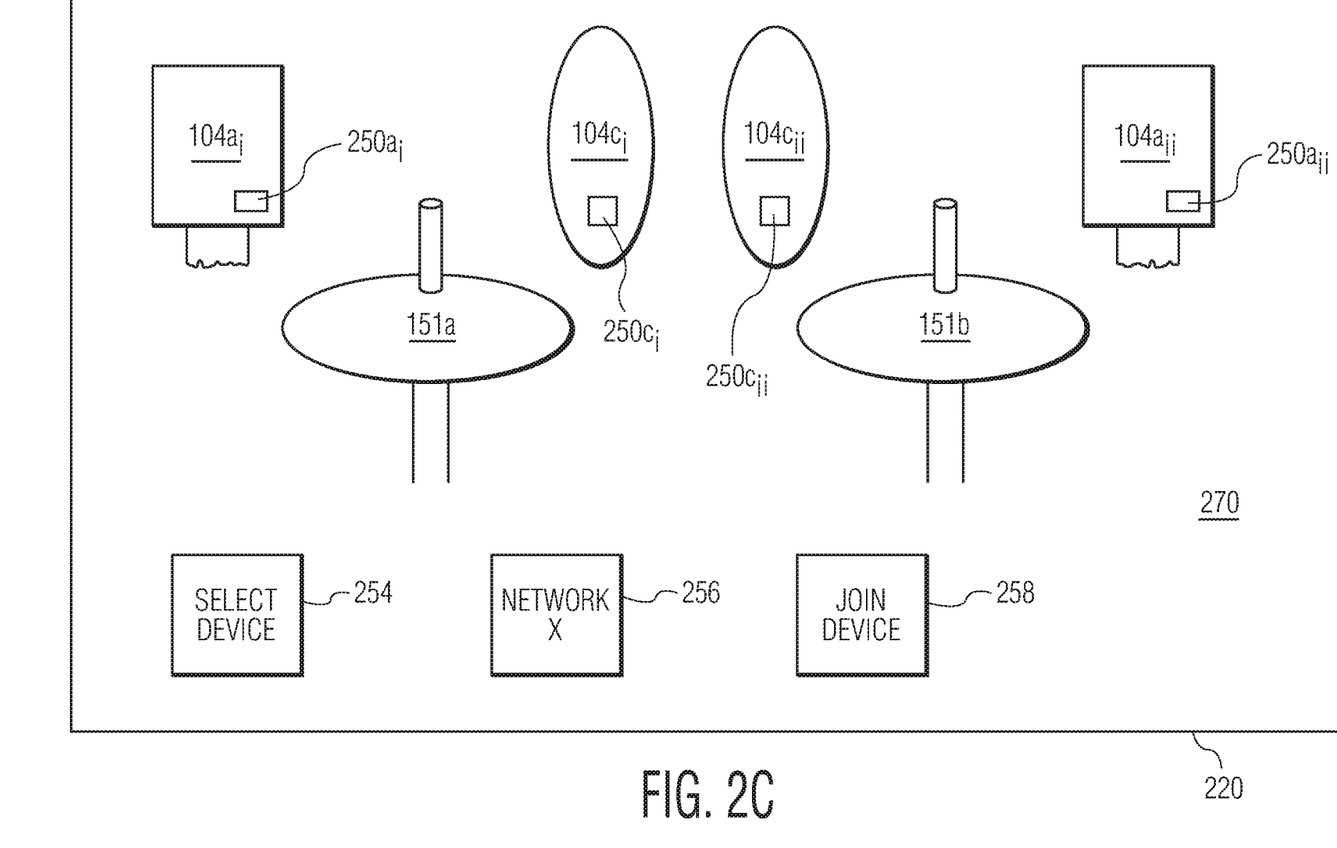
FIG. 2C is a representation of a graphical user interface on the installation device overlaying the representation of the washroom environment.

FIG. 2C is a representation of a graphical user interface 270 on the installation device 105 overlaying the representation of the washroom environment 100. With reference to FIG. 2C, and as described above, each device 104 has a unique identifier 250, e.g., device $104a_i$ has unique identifier $150a_i$ and device $104c_{ii}$ has unique identifier $250c_{ii}$. These unique identifiers can be, for example, device 104 serial numbers, MAC addresses, or fabricated or fanciful numbers, letters or alphanumerics assigned to the devices 104 by an administrator. These identifiers can be embodied, for example, in alphanumeric form, or code form such as bar or QR codes, e.g., visible on the devices 104 and/or accessible through a wireless communication protocol/process.

In some implementations, the devices 104 include wireless communication equipment (e.g., transceivers) that allow the devices 104 to wirelessly communication with the installation device 105, e.g., through cellular, BLUETOOTH and/or NFC protocols and procedures. As such, the installation device 105 can wirelessly interrogate a device 104 to query its unique identifier. For example, the installation device 105 uses NFC to query the device 104 closest to it, e.g., the only dispenser in range for such communications. In response to the query, the device 104 can transmit its identifier and (optionally) generate a visual queue (e.g., flashing LED or dispense product) to confirm which device 104 is communicating with the installation device 105. In some implementations, the device 104 may have an actuator (e.g., a push button or the like) that when actuated (e.g., pressed) by a user causes the device 104 to wirelessly broadcast its unique identifier, which can be detected by the installation device 105.

In some implementations, the application 125 also includes options to select an identified device 254, e.g., which allows a user to select one of the identified devices 104 in the representation, to select a network 256 to which a device 104 is to be joined and a join device option 258 to cause a selected device 104 to be joined to the selected network. The operation of the application 125 is described in more detail with reference to FIG. 3, which is example method 300 of generating a network name for a device 104 joined to a network.

Figure 3:
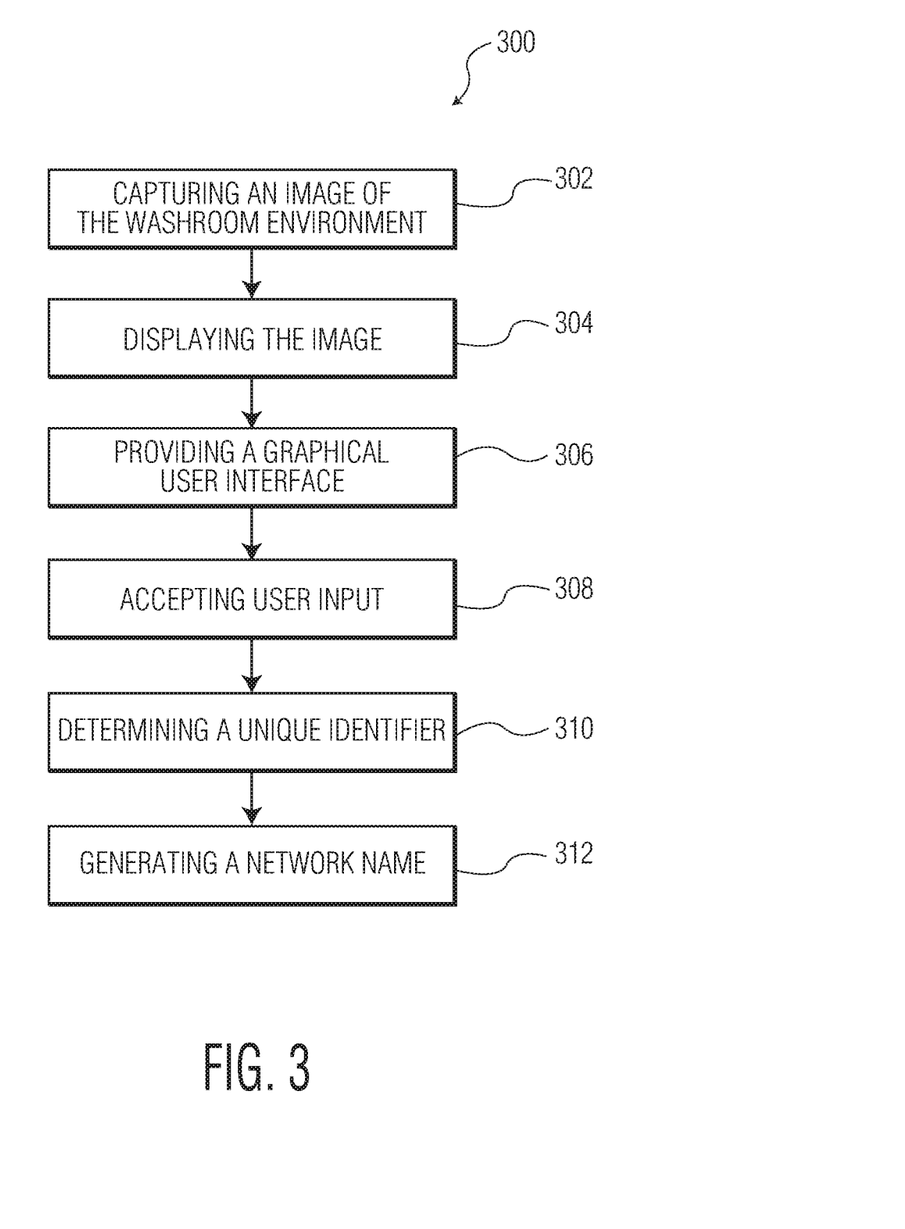
FIG. 3 is an example method of generating a network name for a device joined to a network.

Through use of an installation device, an image of a washroom environment having a network-enabled washroom dispenser is captured (302). For example, the installation device 105 can use its imaging device to capture an image, e.g., picture or representation, of the facility 107 with one or more devices 104. In some implementations, a user may use the installation device 105 to capture multiple images, e.g., one image per device 104 or one image per wall of the facility 107, such wall having multiple devices 104, or may capture a panoramic image or panning video clip of the entire facility 107. The captured image may include the unique identifier of the devices 104, provided such identifiers are visually displayed on the devices 104, e.g., a printed or stamped serial number or a bar or QR code printed on a label applied to the device 104.

The image is displayed on the installation device (304). For example, the image is displayed on the screen 220 of the installation device 105, as shown in FIG. 2B. In some implementations the images can be stored on the installation device 105 for later access and use. For example, a user may capture multiple images of multiple facilities 107 and later access those images for purposes of joining the devices 104 captured in those images to a network. The images can include one or more points of reference. For example, each image or set of images for a facility 107 can include a point of reference such as an entryway 103 into the facility 107. The location information, as described below, can be used to "stitch" multiple images for a facility 107 into a panoramic image of the entire facility 107 showing all devices 104 and their relative location to each other and/or a point of reference such as the entryway 103. In some implementations, the user captures images of the facility 107 such that parts of each image overlap another image to define the placement of the individual images in the stitched together panoramic image. For example, a user uses the installation device 105 to take a first image of the facility 107 with devices A, B, and C and the entryway. The second image will capture devices C and D, and the final image with devices D, E and F and the entryway. The installation device 105 (or the data processing apparatus 102), as directed by the application 125, can piece the images together based on the commonalities of the devices 104 (and/or other features) captured in the overlapping images. An image can be a static representation capturing the environment 100 (or a portion thereof) at a fixed point in time (e.g., a camera picture) or it can be a live and continuous capture of the environment in real-time (e.g., a video feed) or this real-time image can be recorded as a video to be played back later, and on which the process 300 can be performed.

In some implementations, the installation device 105, e.g., at the direction of the application 125, tags the image with location information regarding the location of where the image was captured/taken. For example, the installation device 105 can use GPS, GPS with cellular assist, wireless signal triangulation, proximity/time of flight analyses from known communication points, elevation data, compass, user input, etc., to determine or generate the location information. As described below, this information can be used to determine the absolute position of the devices 104. Absolute position in this context means the location of the device 104 with respect to a known, fixed grid or coordinate system, e.g., latitude and longitude, Cartesian coordinate system.

A graphical user interface is provided simultaneously with the display of the image (306). For example, the application 125, accessible by the installation device 105, enables the provision of a graphical user interface 270 that is concurrently displayed on the screen 220 with the image, e.g., as shown in FIG. 2C. The application 125 is a computer program that, for example, is running on a mobile computing system such as a smart phone, tablet or laptop (e.g., the installation device 105). Such a computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. The application 125 can be installed on the installation device 105, the data processing apparatus 102, in combination on both, or run from one or both the installation device 105 and the data processing apparatus 102 as a software as a service application (e.g., in a cloud computing environment). In some implementations the graphical user interface 270 operates in conjunction with the touchscreen 220 of installation device 105, e.g., a touch on the touchscreen can be sensed and interpreted by the graphical user interface 270.

The application 125 can also enable the identification of features or items in the image. For example, the application 125 can identify devices 104 present in the image through various image analysis techniques such as, without limitation, Blob detection, template matching and SURF feature extraction. In some implementations, the application 125 has access to multiple known images (e.g., from various angles and at different distances) of one or more of the devices 104, these are referred to as template device images 127. The application 125 compares (e.g., based on pixels or image feature similarities) the template device images 127 to portions of the image to detect possible matches, e.g., greater than 90 percent of the compared pixels or features match between the corresponding image portion and a template device image 127.

Figure 2D:
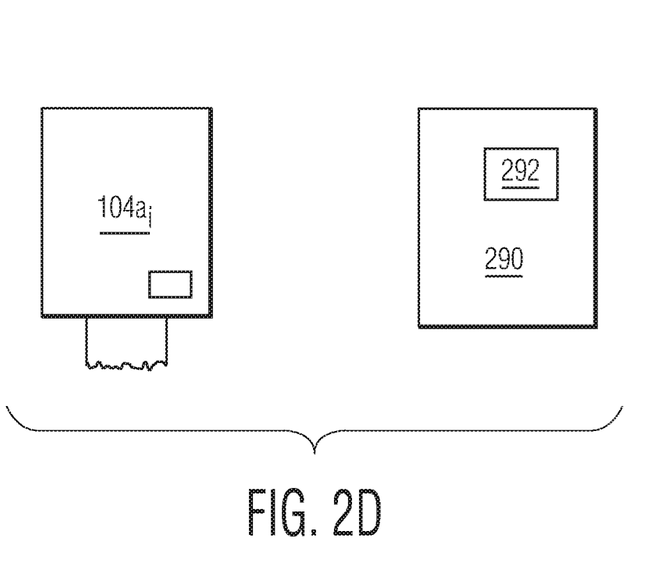
FIG. 2D is a representation of an example template device image and corresponding image of a device.

The template device images 127 can be associated with metadata or other information describing or characterizing the devices 104 to which the respective template device images 127 correspond. The application 125 has access to such descriptive data or information. Such data or information may describe the type of device, e.g., hand towel dispenser, soap dispenser, bath tissue dispenser, the manufacturer of the device 104, the make and/or model of the device 104 and the like. For example, as seen in FIG. 2D, which is a representation of an example template device image 127 and corresponding image of a device 104, the template device image 290 corresponds to hand towel device 104$a_i$. The descriptive data 292 for this device 104 describe that it is a hand towel dispenser and is a Model Y from Manufacturer X.

A user input to the graphical user interface is accepted to select the at least one washroom dispenser (308). For example, through the device identification process described above, the application 125 has identified one or more devices 104 represented in the image. A user can then interact with the graphical user interface 270 on the installation device 105 and select one or more of the identified devices 104 represented in the image on the screen 220. For example, the screen 220 may be a touchscreen and the user can select a device 104 by touching (once or in some cases multiple times) the area of the screen displaying the image of the device 104. In some implementations, the application 125 automatically identifies the devices 104 in the image in response to the installation device 105 capturing the image. In other implementations, the identification process is initiated by a user selecting the Select Device instruction 254. In either case, in some implementations, the devices 104 identified by the application 125 will be set off on the screen 220, e.g., by color, text, highlighted or surrounded by a circle or square, to indicated that they are selectable items.

A unique identifier of the dispenser is determined (310). As described above, the unique identifier of a device 104 can be a serial number, MAC address, or fabricated numbers, letters or alphanumerics assigned to the devices 104 by an administrator. In some implementations, these unique identifiers can be embodied, for example, in alphanumeric form or code form such as bar or QR codes. For example, with reference to FIG. 2C, the unique identifiers for devices 104$a_i$ and 104$c_{ii}$ are, respectively, 250$a_i$ and 250$c_{ii}$.

In some implementations where the unique identifiers are visible on the device 104 and captured in the image, the application 125 can read the unique identifier for the device 104 from the captured image, e.g., through an optical character recognition process or through a feature identification and decoding process as would be used for bar codes or QR codes.

The available network(s) to which a device 104 may be joined can be selected by a user through interaction with item, e.g., button, 256. The available networks can be determined by the application 125 through a process that recognizes broadcasts from available networks or pre-set by an administrator. In some implementations, there is only one network to which a device 104 can be joined so item 256 may not be available.

A network name for the dispenser is generated based on a relative location of the dispenser in the washroom environment (312). The network name of a device 104 (e.g., hygienic dispenser) conveys its location with respect to its position in a facility 107. Once a device 104 has been selected to be joined to a given network, a user can join that device 104 by interacting with the Join Device item 258 presented by the graphical user interface 270. In response, the application 125 "reads" the unique identifier of the device 104 and, in some implementations, accesses relative position information about the device 104. As described above, the relative position information about the device 104 can be determined with reference to a reference point in the facility 107 such as a door or entryway (e.g., entryway 103) and according to a first protocol, as described below.

The first protocol defines one or more rules for generating the naming information for the devices 104 based on (i) a sequence of the devices 104 according to the spatial orientations of the devices 104 (in their respective facility 107) and (ii) a reference defining a starting point for the sequence 115. The application 125 has access to the rules. The relative location of each device 104 is with respect to its particular place/order in the sequence 115. For example, the first device 104 in the sequence 115 has a sequence order number of 1 and the third device in the sequence 115 has a sequence order number of 3. Generally, for any given facility 107, each device 104 has a spatial orientation defining its position relative to a position of at least one other device 104 (in a same facility) and/or another point of reference in the facility 107, e.g., a door or entryway 103 into or out of the facility 107. For example, with respect to the facility 107 in FIG. 1, the device 104$b_i$ is between the door 103 and the device 104$b_{ii}$. Or, with respect to a central reference point 119 in the facility 107, the device 104$b_i$ is the first device from the door 103 (e.g., a starting point) in a clockwise direction (e.g., along path 115). Likewise, the device 104$b_{ii}$ is the third device from the door 103 in the clockwise direction, and the device 104$c_{ii}$ is the sixth device from the door 103 in the clockwise direction.

With respect to a counterclockwise direction from the door 103, the device 104$a_{ii}$ is the first device and the device 104$c_{ii}$ is the second device. Other spatial orientation schemes are also envisioned. For example, the incrementing can be based on the type of device 104 in the facility 107 such that each common set of device types is numbered 1 to X, e.g., bath tissue dispenser 1 to X, hand towel dispenser 1 to X, hand soap dispenser 1 to X. In some implementations at least one facility 107 in a floor or building includes at least two different types of end point devices 104.

The sequence 115 defines the order in which the devices 104 are processed (e.g., named) based on the spatial orientation of the devices 104, e.g., in a clockwise or counterclockwise direction around the facility 107. The starting point is used to identify the first device 104 in the sequence 115. For example, the starting point can specify that the first device in the sequence 115 is the device 104 closest to the door 103 (or other reference point in the facility 107) in a clockwise direction (or counterclockwise direction).

The spatial relationship or location of the devices 104 can be determined by the application 125 based on the positioning of the devices 104 in the captured image. For example, and as described above, through image analysis techniques, the application 125 can determine the starting point (as programmatically set or set by a user of the installation device 105 on a per facility basis) and order the devices 104 in the sequence 115 by comparing the position of the each device 104 in the image relative to the other devices (and/or starting point for the first ordered device 104).

In some implementations, the application 125 can use its position and orientation to determine or supplement the relative location information of the devices 104, including with absolute positional information. For example, based on the installation tool's 105 features, the application 125 can use one or a combination of (depending on what's available through the installation device 105) GPS, wireless signal strength levels, triangular, compass data, accelerometers, barometer, altimeter, to name a few, to determine the position of the installation device 105. Overlaid on mapping information, the application 125 can use this location information to determine the address, city, state, country, etc. in which the installation device 105 is located. If in a multi-story building and with access to the layout of the building, the application could determine the room in which the installation tool 105 is in (e.g., Men's bathroom in the Northwest corner of the third floor). The application 125 can also use this information to determine the absolute location of the devices 104. For example, based on the known location of the installation device 105, the orientation of the installation device 105 when it captured an image of the device 104 and the distance of the device 104 from the installation device 105 when the image was captured, e.g., as determined through an analysis of the focal depth or length of the imaging device at that time, the application 125 can determine the absolute location of the device 104. Thus, in addition to or alternatively to constructing the sequence based solely on image analyses of the relative positions of the devices 104 in the images, the application 125 can determine the sequence 115 based on the absolute position of the devices 104.

The rules can be programmatically defined, e.g., by an administrator in program code or scripts, and/or be fully or partially manually specified by an administrator. The rules can also specify additional naming conventions. For example, in the context of washroom facilities in a building, the convention can be "washroom gender/floor number-device type-device position in sequence," where washroom gender is male (M), female (FE) or family (FA); floor is the floor number on which the facility 107 is located so first floor would be 1, second floor would be 2 and so on; device type is the type of device such as hand towels dispenser (HT), bath tissue dispenser (BT), soap dispenser (SO) and so on; and device position in sequence is the number of the device in the sequence as described above.

Thus for a hand towel dispenser in the men's washroom on the first floor located second from the door according to the sequence 115 then the system 123 would name the device M1-HT-2. Likewise for a soap dispenser in the women's washroom on the third floor located third from the door according to the sequence then the system 123 would name the device W3-SO-3. In this way, for example, when a service attendant for the building receives a message indicating that a hand towel dispenser 104 needs to be serviced, e.g., because it is low on paper, the name of the dispenser 104 in the message informs the attendant as to the specific location of the dispenser 104, and the attendant can go directly to that dispenser 104 without having to cross-check or consult another database or list. This further allows for a compact message, as opposed to including in the message a longer written description in prose, which requires additional bandwidth to transmit and is less efficient.

In some scenarios multiple of the same room type (e.g., two men's washrooms) may be on a single floor. Thus in some implementations, for example, the rules specify the following naming convention: "washroom gender/floor number-facility name qualifier-device type-device position in sequence," where the facility name qualifier can be set by an administrator or user. In some implementations, the qualifier is descriptive so as to immediately impart location information. For example, if the floor includes men's washrooms on the South and North sides of the building then the respective qualifier could be southside or northside. As such, for a hand towel dispenser in the men's washroom on the southside of the first floor located second from the door according to the sequence and a hand towel dispenser in the men's washroom on the northside of first floor located fourth from the door according to the sequence then the system 123 would name the devices, respectively, M1-southside-HT-2 and M1-northside-HT-4. The above examples have focused on washrooms but other types of facilities and devices are also envisioned such as, for example, devices in an office, break room, manufacturing area, food preparation area, etc.

EMBODIMENTS

Embodiment 1. A system comprising: an installation device comprising a screen and an imaging device, wherein the imaging device is configured to capture a representation of an environment having at least one network-enabled washroom dispenser and the screen is configured to visually present the representation for viewing by a user; and an application configured to: analyze the representation to identify, as a dispenser device, the at least one dispenser and present a graphical user interface, as an overlay on the representation, through which the user can select the at least one dispenser by interacting with the graphical user interface; determine a unique identifier of the at least one dispenser; and generate a network name for the at least one dispenser different from the unique identifier.

Embodiment 2. The system of embodiment 1, wherein determine a unique identifier of the at least one dispenser comprises use an image processing technique to optically read a serial number or code visually displayed on the at least one dispenser.

Embodiment 3. The system of any preceding embodiment, wherein determine a unique identifier of the at least one dispenser comprises interrogate the at least one dispenser to query the unique identifier.

Embodiment 4. The system of any preceding embodiment, wherein the application is at least partially run from the installation device.

Embodiment 5. The system of any preceding embodiment comprising a data processing apparatus in data communication with the installation device, wherein the application is at least partially run from the data processing apparatus.

Embodiment 6. The system of any preceding embodiment, wherein the representation including a reference point in the environment and generate a network name for the at least one dispenser different from the unique identifier comprises generating the name based on the relative position of the at least one dispenser to the reference point.

Embodiment 7. The system of any preceding embodiment wherein the representation is an image of the environment and analyze the representation to identify the at least one dispenser comprises match a shape of the at least one dispenser in the image to one of multiple dispenser images depicting respective known dispensers.

Embodiment 8. A method comprising: capturing, through use of an installation device, an image of a washroom environment having a network-enabled washroom dispenser; displaying the image on the device; providing a graphical user interface simultaneously with the display of the image; accepting an user input to the graphical user interface to select the at least one washroom dispenser; determining a unique identifier of the dispenser; generating a network name for the dispenser based on a relative location of the dispenser in the washroom environment.

Embodiment 9. The method of embodiment 8, wherein determining a unique identifier of the dispenser comprises image processing the image to optically read a serial number or code visually displayed on the dispenser.

Embodiment 10. The method of any preceding embodiment from 8-9, wherein determining a unique identifier of the dispenser comprises interrogating the dispenser to query the unique identifier.

Embodiment 11. The method of any preceding embodiment from 8-10, wherein the installation device is a mobile device.

Embodiment 12. The method of any preceding embodiment from 8-11, wherein the mobile device has a camera and capturing an image of a washroom environment comprises using the camera to take a picture of the washroom environment.

Embodiment 13. The method of embodiment 12, wherein capturing an image of a washroom environment comprises using the camera to take multiple pictures of the washroom environment to create a panoramic view of the washroom environment.

Embodiment 14. The method of any preceding embodiment from 8-13 comprising visually setting off the selected dispenser in response to accepting a user input.

Embodiment 15. The method of any preceding embodiment from 8-14 comprising determining a location of the device in a facility based on a location and orientation of the installation device and a location of the device in the image.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus or system on data stored on one or more computer-readable storage devices or received from other sources.

The term data processing apparatus or data processing system encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user computer (e.g., for purposes of displaying data to and receiving user input from a user interacting with the user computer). Data generated at the user computer (e.g., a result of the user interaction) can be received from the user computer at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A system comprising:
    an installation device comprising a screen and an imaging device, wherein the imaging device is configured to capture a representation of an environment having at a plurality of network-enabled washroom dispensers and the screen is configured to visually present the representation for viewing by a user; and
    an application configured to:
        analyze the representation to identify, as a dispenser device, the plurality of dispensers and present a graphical user interface, as an overlay on the representation, through which the user can select at least one of the plurality of dispensers by interacting with the graphical user interface;
        determine a unique identifier of the at least one dispenser; and
        generate a network name for the at least one dispenser different from the unique identifier, wherein the representation includes a reference point in the environment and
    generate a network name for the at least one dispenser different from the unique identifier comprises:
        generating the network name based on a relative position of the at least one dispenser to the reference point through an analysis of the representation comprising using a first protocol that defines one or more rules based on (i) a sequence of the plurality of dispensers according to spatial orientations of the plurality of dispensers and (ii) the reference point in the representation defining a starting point for the sequence, and wherein the network name includes relative position information.

2. The system of claim 1, wherein determine a unique identifier of the at least one dispenser comprises use an image processing technique to optically read a serial number or code visually displayed on the at least one dispenser.

3. The system of claim 1, wherein determine a unique identifier of the at least one dispenser comprises interrogate the at least one dispenser to query the unique identifier.

4. The system of claim 1, wherein the application is at least partially run from the installation device.

5. The system of claim 1 comprising a data processing apparatus in data communication with the installation device, wherein the application is at least partially run from the data processing apparatus.

6. The system of claim 1 wherein the representation is an image of the environment and analyze the representation to identify the at least one dispenser comprises match a shape of the at least one dispenser in the image to one of multiple dispenser images depicting respective known dispensers.

7. A method comprising:
capturing, through use of an installation device, an image of a washroom environment having a plurality of network-enabled washroom dispensers;
displaying the image on the device;
providing a graphical user interface simultaneously with the display of the image;
accepting an user input to the graphical user interface to select at least one of the plurality of washroom dispensers;
determining a unique identifier of the at least one dispenser;
generating a network name for the at least one dispenser based on a relative location of the at least one dispenser in the washroom environment through an analysis of the image using a first protocol that defines one or more rules based on (i) a sequence of the plurality of dispensers according to spatial orientations of the plurality of dispensers and (ii) a reference point in the image defining a starting point for the sequence, and wherein the network name includes relative position information.

8. The method of claim 7, wherein determining a unique identifier of the at least one dispenser comprises image processing the image to optically read a serial number or code visually displayed on the at least one dispenser.

9. The method of claim 7, wherein determining a unique identifier of the at least one dispenser comprises interrogating the at least one dispenser to query the unique identifier.

10. The method of claim 7, wherein the installation device is a mobile device.

11. The method of claim 10, wherein the mobile device has a camera and capturing an image of a washroom environment comprises using the camera to take a picture of the washroom environment.

12. The method of claim 11, wherein capturing an image of a washroom environment comprises using the camera to take multiple pictures of the washroom environment to create a panoramic view of the washroom environment.

13. The method of claim 7 comprising visually setting off the at least one dispenser in response to accepting a user input.

14. The method of claim 7 comprising determining a location of the at least one dispenser in a facility based on a location and orientation of the installation device and a location of the at least one dispenser in the image.

15. A system comprising:
an installation device comprising a screen and an imaging device, wherein the imaging device is configured to capture a representation of an environment having a plurality of network-enabled washroom dispensers and the screen is configured to visually present the representation for viewing by a user; and
an application configured to:
analyze the representation to identify, as a dispenser device, at least one of the plurality of dispensers and present a graphical user interface, as an overlay on the representation, through which the user can select the at least one dispenser by interacting with the graphical user interface;
determine a unique identifier of the at least one dispenser; and
generate a network name for the at least one dispenser different from the unique identifier based on a position of the at least one dispenser in the environment through an analysis of the representation using a first protocol that defines one or more rules based on (i) a sequence of the plurality of dispensers according to spatial orientations of the plurality of dispensers and (ii) a reference point in the representation defining a starting point for the sequence, and wherein the network name includes relative position information.

* * * * *